July 25, 1961 G. K. BERNHARD ET AL 2,993,265
CONVEYORS FOR FABRICATING INSTALLATION
Filed Nov. 25, 1957 6 Sheets-Sheet 6
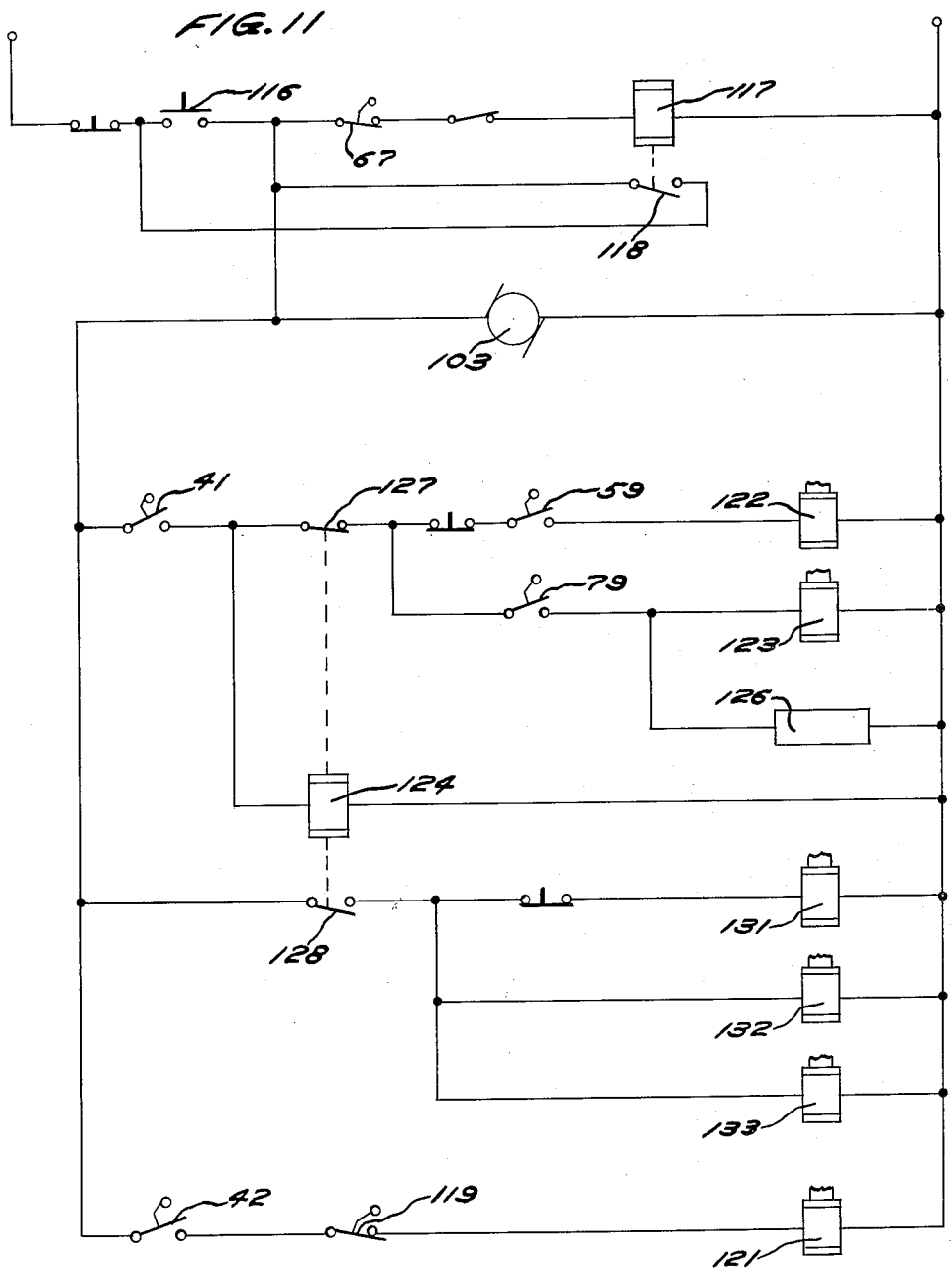
INVENTORS
G.K.BERNHARD
A.F.GLAUBKE
J.H.TODD
BY R.P. Miller
ATTORNEY United States Patent Office 2,993,265
Patented July 25, 1961

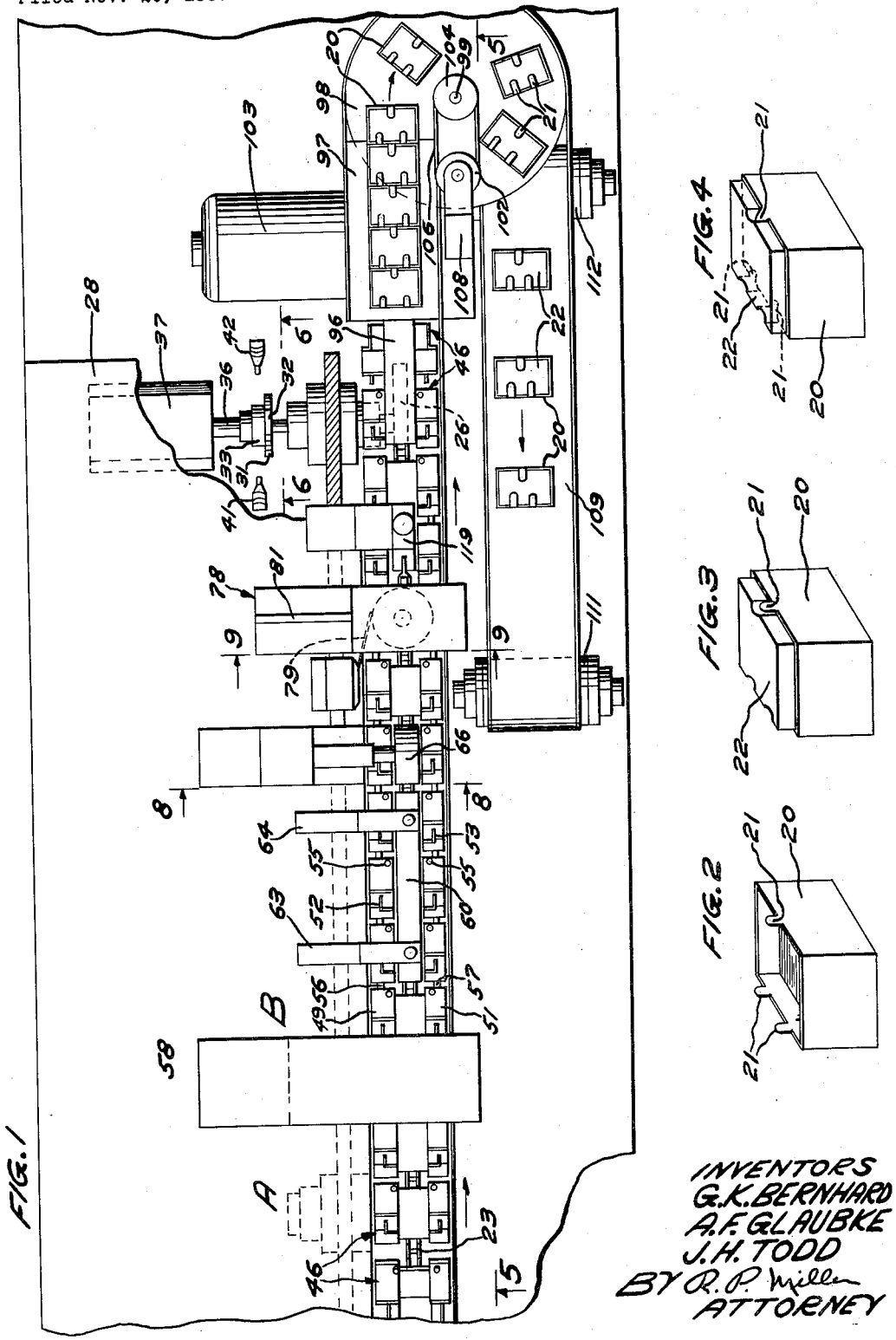

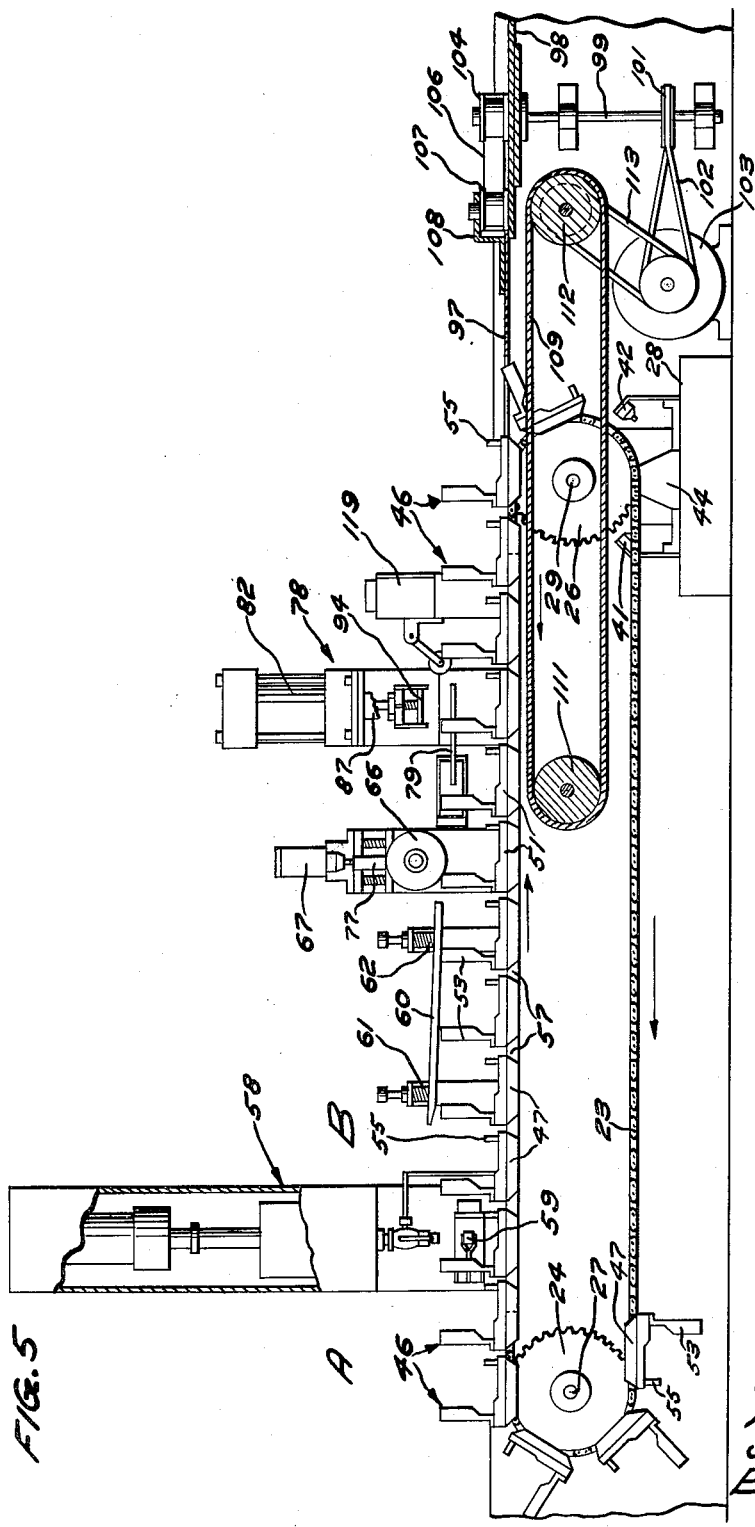

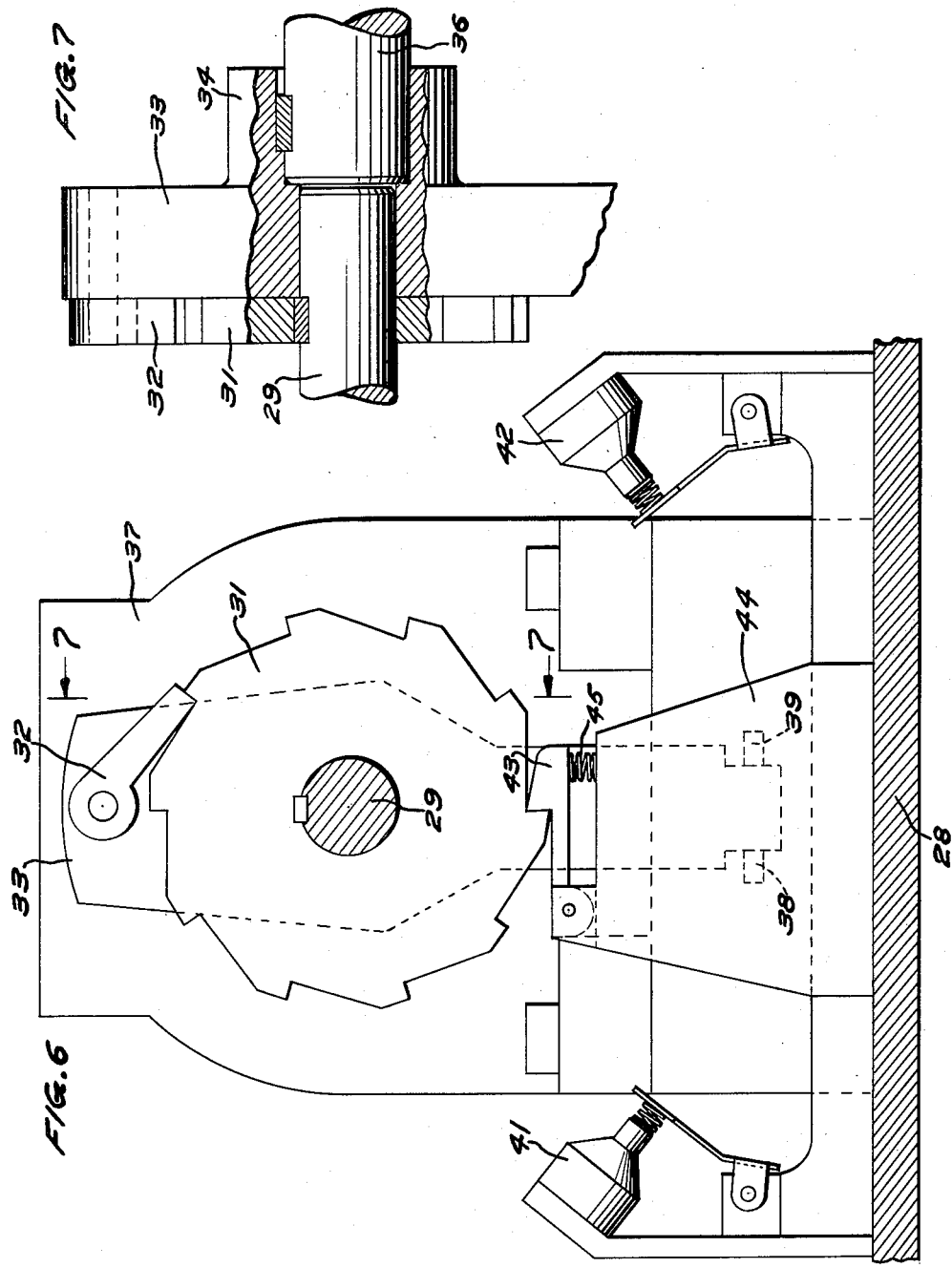

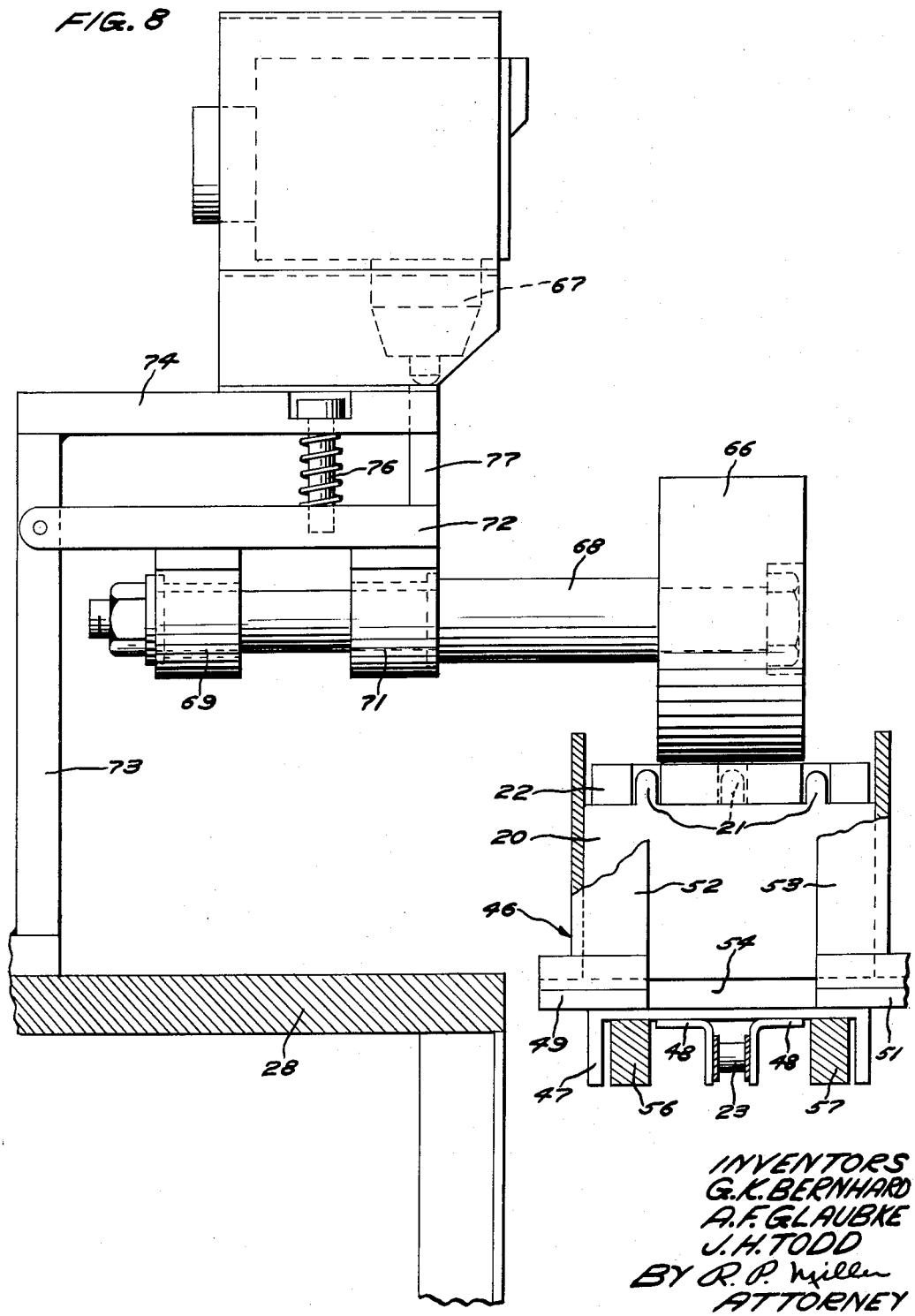

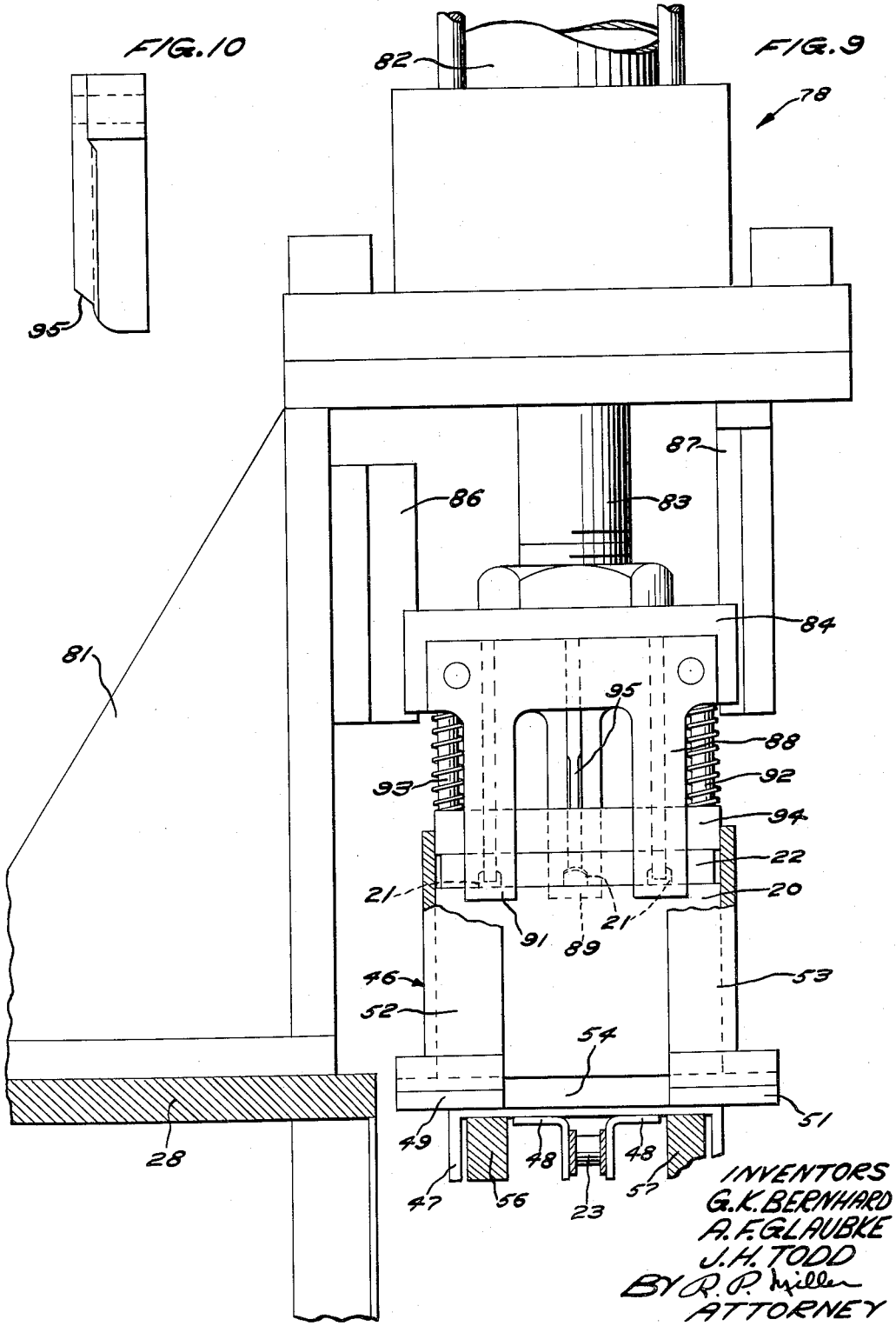

1

2,993,265
CONVEYORS FOR FABRICATING INSTALLATION
George K. Bernhard, Allen F. Glaubke, and John H. Todd, Indianapolis, Ind., assignors to Western Electric Company, Incorporated, New York, N.Y., a corporation of New York
Filed Nov. 25, 1957, Ser. No. 698,838
5 Claims. (Cl. 29—200)

This invention relates to conveying apparatuses for automatic fabricating machines, and more particularly to an intermittently operated conveyor for feeding articles through checking and fabricating devices to a continuously operable conveying and orienting device.

In installations utilizing a line of machines for automatically fabricating articles, it is necessary that each article is positively supported to permit the fabricating machines to perform their designated functions. Further in the operation of such installations, facilities must be provided to ascertain the proper positionment of articles prior to the initiation of the operation of each fabricating machine. If these facilities ascertain that an article is missing or that an article is improperly positioned, or that a component on the article is not in position to be worked upon, then the facilities must interrupt the cyclic operation of the installation in order that corrective measures may be taken. Frequently in such installations, it is desired to transfer fabricated articles from an intermittently operated conveyor to a continuously operated conveyor wherein the articles are evenly spaced and uniformly oriented to facilitate further handling or other fabricating operations.

It is an object of this invention to provide an improved conveying installation wherein articles may be intermittently fed to a series of fabricating stations and then transferred to a continuously operable transfer means wherein the articles are arranged in an oriented order.

Another object of the invention resides in facilities for checking the positionment of articles or components mounted thereon and accordingly controlling the movement of a carrier on which the articles are supported.

A further object of the invention is the provision of a vertical loop carrier having laterally spaced article supports together with a plate projecting into the path of movement and between the supports for lifting articles therefrom as the carrier advances.

A more finite object of the instant invention resides in a turntable-type conveyor operating in conjunction with an endless belt-type conveyor positioned across a radius of the turntable for the purpose of orienting and ejecting articles from the turntable.

With these and other objects in view, the present invention contemplates in a fabricating installation an endless chain-type conveyor intermittently operated to advance articles through a series of fabricating stations. Each article is held by a pair of spaced supports secured to the conveyor and between which a plate is projected to remove the articles from the support as the conveyor moves in a downward direction. Successively removed articles push previously removed articles onto a turntable that advances each article into engagement with a continuously operable endless belt that functions to orient and eject the articles onto a continuously moving conveyor. Sensing facilities are positioned along the endless chain-type conveyor to ascertain the presence of articles and components mounted thereon and are adapted to accordingly interrupt the operation of the installation upon ascertainment of a missing or improperly positioned article or component.

Other objects and advantages of the present invention will be apparent from the folowing detailed description when considered in conjunction with the accompanying drawings, wherein

2

FIG. 1 is a top plan view of a conveyor and fabricating machine installation embodying the principal features of the present invention;

FIGS. 2, 3 and 4 illustrate views of an electrical network container in three stages of manufacture by the machines shown in FIG. 1;

FIG. 5 is a side elevational view partially in section taken along line 5—5 of FIG. 1 particularly illustrating the arrangement of two endless conveyors;

FIG. 6 is an enlarged front elevational view of a pawl and ratchet feed mechanism for imparting intermittent movement to one of the conveyors shown in FIGS. 1 and 5, taken generally along line 6—6 of FIG. 1;

FIG. 7 is a side elevational view of the pawl and ratchet feed mechanism taken along line 7—7 of FIG. 6;

FIG. 8 is an enlarged front elevational view of a sensing device for ascertaining the position of an electrical network in a container, taken generally along line 8—8 of FIG. 1;

FIG. 9 is an enlarged front elevational view of a device for crimping lugs extending from a container, taken generally along line 9—9 of FIG. 1;

FIG. 10 is a side elevational view of a crimping element utilized in the crimping device shown in FIG. 9, and FIG. 11 is a circuit diagram illustrating the control facilities for the installation shown in the other figures.

Referring first to FIGS. 2, 3 and 4, there is shown a container or can 20 into which it is desired to apply a metered amount of a gelatinous substance or material. The container 20 is formed with three projecting lugs 21 arranged as best illustrated in FIG. 2. It is further desired to insert an electrical network 22 into a container that has been previously filled with the gelatinous substance. It is also contemplated to provide facilities for crimping the lugs over to secure the network 22 in the can 20 as clearly illustrated in FIG. 4.

Attention is directed to FIGS. 1 and 5 wherein there is shown an endless chain 23 mounted on a pair of sprockets 24 and 26. Sprockets 24 is secured to a shaft 27 that is rotatably mounted in a base framework 28. Sprocket 26 is mounted securely on a shaft 29 that is adapted to be intermittently driven by the pawl and ratchet device illustrated in FIGS. 6 and 7.

More particularly referring to FIGS. 6 and 7, it will be noted that the shaft 29 has keyed thereto a ratchet 31 that is engaged by a pawl 32 rotatably mounted on an actuating lever 33. Lever 33 in turn has hub section 34 that is keyed to a shaft 36 that is adapted to be oscillated through the instrumentality of a commercially available hydraulic motor 37. The lower portion of the lever 33 is provided with a pair of switch actuators 38 and 39 that function to operate a pair of switches 41 and 42 to limit the extent of movement of the lever 33 in a single direction. Switches 41 and 42 are connected to operate solenoids that function to control the application of hydraulic fluid to the motor 37. An anti-backlash holding detent 43 is pivotally mounted on a bracket 44 extending from the base framework 28. This holding detent 43 is urged by a spring 45 into engagement with the ratchet 31 to preclude retrograde movement of the ratchet during counterclockwise movement of the pawl 32 on the teeth of the ratchet 31.

The chain 23 has secured thereto a plurality of container holders generally designated by the reference numeral 46. Each container holder consists of a U-shaped bottom plate 47 (FIG. 8) secured through the instrumentality of L-shaped elements 48 to the chain 23. Attached to the upper surface of the plate 47 is a pair of spaced supports 49 and 51. As most clearly viewed in FIG. 1, there is secured to the rear sections of the supports 49 and 51 a pair of L-shaped upright brackets 52 and 53, When a container 20 is loaded into a holder 46, the bottom thereof rests on the top of the supports 49 and 51 to provide a space 54 between the bottom of the container and the top of the U-shaped plate 47. In order to hold a container against the brackets 52 and 53, a pair of pins 55 are secured to the front extremity of the supports 49 and 51. As the chain conveyor 23 moves the container holders 46 in the top portion of the loop, the plate 47 of each container holder is engaged by a pair of rigid guide bars 56 and 57 that are attached to the base framework 28.

As the chain conveyor 23 is intermittently advanced, an attendant stationed at the location indicated by the reference letter A loads containers into each work holder 46, whereafter the subsequent advance of the chain conveyor moves each container into a metering station generally designated by the reference numeral 58. As the container is moved into this metering station, a sensing switch 59 ascertains the presence of the container and initiates operation of the metering device 58 to permit the passage of a predetermined amount of gelatinous material into the container.

Next, the chain 23 advances each container into a station generally designated by the reference letter B, whereat another attendant will load networks 22 into each container that has the gelatinous material therein. Subsequent advance of the chain 23 moves each container 20 beneath a pressing bar 60 that functions to push the network firmly within the container. This bar 60 is supported by a pair of springs 61 and 62 that are in turn attached to a pair of brackets 63 and 64 mounted on the base framework 28.

As the chain 23 further advances the work holders 46, the containers mounted therein are engaged by a roller 66 that functions to sense the positionment of the network 22 within the container. If the bar 60 did not properly press the network within the container, then the roller 66 will be urged upwardly to actuate a switch 67 that is connected in the control circuit for the overall installation. Referring to FIG. 8, the roller 66 is shown as being mounted on a shaft 68 positioned within bearings 69 and 71. These bearings are in turn mounted on an arm 72 that is pivotally mounted on a bracket 73 extending from the base framework 28. A laterally extending bracket 74 provides a support for the switch 67 and also for a spring-urged stud 76 that is attached to the arm 72. Also attached to the arm 72 is a rod 77 adapted to operate the switch 67 whenever the arm 72 is pivoted in an upward direction by the action of the roller 66 sensing a network 22 improperly extending from a container 20.

As the chain 23 advances the holder into a crimping station 78, a sensing switch 79 probes for the presence of a container in the work holder. If a container is ascertained as being present then the switch 79 is effective to operate the crimping device which moves downwardly to bend the lugs 21 over to secure the network 22 within the container. Attention is directed to FIG. 9 wherein the details of the crimping device are shown. A bracket 81 secured to the base framework 28 supports an air cylinder 82 that functions to move a piston rod 83 downwardly. Secured to the lower extremity of the piston rod 83 is a head 84 adapted to ride within guides 86 and 87. This head carries three crimping elements 88, 89 and 91. In addition, the head 84 supports through spring-biased studs 92 and 93, a holddown plate 94. This plate 94 extends below the extremities of the crimping elements 88, 89 and 91 when the head 84 is in the elevated position as illustrated in FIG. 5. Each crimping element has a cam surface 95 formed thereon for engaging and bending over the lugs 21 extending from the container 20. The contour of the cam surface 95 is clearly illustrated in FIG. 10.

Upon completion of the crimping operation, the chain 23 is effective to advance each work holder 46 so that a lift plate 96 is positioned within the space 54 formed between the plate 47 and the bottom of the container 20. As the chain moves over the sprocket 26 and moves the work holders downwardly, the fabricated container 20 will be retained on the plate 96 and upon the movement of subsequent containers onto the plate 96 each container is moved onto a second plate 97 and eventually onto a continuously rotating turntable 98.

Turntable 98 is secured to a shaft 99 having a pulley 101 (see FIG. 5) which in turn is driven by a belt 102 off of a constantly rotating motor 103. Mounted near the upper extremity of the shaft 99 is a pulley 104 having an endless belt 106 mounted thereon. The belt 106 rides over an idler pulley 107 mounted within a bracket 108 secured to the plate 97. As the containers 20 are rotated by the turntable 98, the leading corner thereof engages the moving belt 106 whereupon the belt pivots the container to move one side of the container into flush engagement therewith. The rotating belt 106 thereupon moves the container radially off the turntable and onto a constantly moving belt-type conveyor 109. Conveyor belt 109 is mounted on an idler pulley 111 and a drive pulley 112. Drive pulley 112 is driven by a belt 113 which in turn is driven by the motor 103.

It may be thus appreciated that as the chain conveyor 23 advances articles at a constant rate, the containers are evenly spaced about the turntable 98. As the turntable 98 rotates to move each container into engagement with belt 106, the belt will pivot the container on the turntable 98 so that the leading edge thereof is fully engaged by the belt. Rotating belt 106 then functions to laterally slide each container onto the conveyor 109. Each and every container advanced to the conveyor 109 is evenly spaced thereon and consistently oriented in the same manner.

Attention is now directed to FIG. 11 showing a circuit diagram for controlling the operation of the apparatuses comprising the installation. In order to initiate operation of the various apparatuses, a start button 116 is depressed to complete a circuit to a relay 117 which draws up a contact 118 to complete a locking circuit about the start button 116. It will be noted that both the start circuit and the locking circuit are completed through switch contacts 67. It will be recalled that the switch 67 is associated with roller 66 that senses the proper positionment of a network 22 within a container 20. If the roller 66 senses an improperly positioned network then the switch contacts 67 are opened to deenergize the relay 117 to interrupt the further operation of the installation.

Upon closure of the start and locking circuits, an obvious circuit is completed to the motor 103 for driving the turntable 98 and conveyor belt 107. Assume that the lever 33 is in engagement with contact 42 (see FIG. 6) then an apparent circuit is completed through a set of switch contacts 119 to a solenoid 121 that functions to control the application of fluid to the hydraulic motor 37. Hydraulic motor 37 then functions to move the pawl 32 to rotate the ratchet 31 to advance the shaft 29 which in turn imparts a movement through the sprocket 26 to the conveyor 23. Switch contacts 119 are actuated to an open position when the head 84 within the crimping device 78 is in the lower position. These switch contacts provide a safety device to preclude the advance of the conveyor when the crimping device is in the down position. The lever 33 will move in a clockwise direction until the switch contacts 41 are operated. This completes the forward advance of the hydraulic motor 37. Closure of contacts 41 completes circuits through article ascertaining switch contacts 59 and 79 to solenoids 122 and 123 that respectively function to control the application of hydraulic fluid to the cylinders associated with the dispensing device 58 and the crimping device 78. Closure of contacts 41 also energizes a time delay relay 124 that is timed to operate after a period sufficient for the dispenser 58 to substantially fill the container 20 with gelatinous material. This period of time is also sufficient to permit the crimping device 78 to move downwardly to crimp the lugs 21 over to secure the network 22 within the container. A counter device 126 is also operated so that an attendant may be apprised of the number of containers that have been fabricated by the installation.

When the time delay relay 124 operates, contacts 127 are opened to interrupt the circuits to the solenoids 122 and 123 and the counter 126. Simultaneously therewith the relay 124 draws up contacts 128 to complete circuits for solenoids 131, 132 and 133. Solenoid 131 controls the hydraulic system for operating the dispensing device 58, and as a consequence, the dispensing device is returned to the initial condition. In a like manner the solenoid 132 controls the hydraulic system running to the crimping device 78, and as a consequence of its operation, the crimping device is restored to the initial position. The solenoid 133 is adapted to control the hydraulic system running to the hydraulic motor 37 so as to reverse its direction of operation. The lever 33 is thereupon moved to again advance the ratchet 31 and the sprocket 28 to move the chain conveyor 23 to position new containers 20 in both the metering device 58 and the crimping device 78. Again as previously described the completely fabricated containers are moved onto the turntable and thereafter oriented and ejected by the belt 106 onto the conveyor 109.

It is to be understood that the above-described arrangements of apparatus and construction of elemental parts are simply illustrative of the application of the principles of the invention and many other modifications may be made without departing from the invention.

What is claimed is:

1. An apparatus for conveying articles, comprising a support frame, a conveyor mounted on said support frame for movement relative thereto, a plurality of article holders, secured to said conveyor in uniform spaced relationship, means for imparting intermittent unidirectional motion to said conveyor, a transfer plate mounted on said support frame in horizontal alignment with said conveyor for successively removing articles from said article holders as said conveyor is intermittently advanced relative thereto, a rotary conveyor movably mounted on said support frame and having a portion thereof positioned beneath said transfer plate for receiving articles successively urged from said transfer plate as a result of an accumulation of articles thereon, a drive shaft secured to and projecting upwardly through said rotary conveyor, means for imparting motion to said drive shaft and said rotary conveyor, a pulley secured to the upper extremity of said drive shaft for movement therewith, and an endless belt mounted for movement with said pulley and engageable with articles being advanced by said rotary conveyor for imparting movement to each successive article relative to said rotary conveyor to align the articles prior to the removal therefrom.

2. An apparatus for conveying articles from a loading station through a fabricating device to an unloading station, which comprises a support frame, a chain conveyor mounted on said support frame for movement relative thereto, a plurality of article holders secured to said chain conveyor in uniform spaced relationship for movement therewith, each of said article holders comprising a pair of bracket members positioned in spaced relationship to said chain conveyor for supporting an article thereon, drive means for intermittently advancing said chain conveyor relative to said support frame, a turntable having a portion thereof positioned in spaced horizontal alignment with said chain conveyor, a drive shaft secured to and projecting upwardly through said turntable, means for imparting continuous unidirectional rotary motion to said shaft and said turntable, a pair of support plates stationarily mounted on said support frame between said chain conveyor and said turntable, a first of said support plates positioned so as to pass through the space between each of said brackets and said chain drive to successively remove articles from article holders being advanced relative thereto, a second of said support plates mounted to receive articles being advanced from said first support plate and positioned slightly above the surface of said turntable for successively depositing articles thereon, a pair of pulleys, a first of said pulleys secured to the upper extremity of said turntable drive shaft for movement therewith, a second of said pulleys rotatably mounted on said support frame, and an endless belt mounted on said pulleys for imparting movement to articles brought into engagement therewith relative to said turntable to align the articles prior to the advancement thereof to an unloading station.

3. A conveying apparatus comprising, a support frame, a rotary conveyor for transporting articles mounted on said support frame, a drive shaft for said conveyor, a pair of pulleys, a first of said pulleys secured to said drive shaft above the surface of said conveyor, a second of said pulleys mounted on said support frame in horizontal alignment with said first pulley, an endless belt mounted on said pulleys and engageable with articles being transported by said conveyor, and means for imparting rotary motion to said drive shaft to advance the belt to rotate articles engaged thereby relative to the conveyor and across the surface of said conveyor.

4. A conveying apparatus for a fabricating installation whereat components are mounted with receptacles being advanced relative thereto, which comprises a support frame, a chain conveyor mounted on said support frame for movement relative thereto, drive means for intermittently advancing said chain conveyor, a plurality of receptacle-holding fixtures secured to said chain conveyor, each of said fixtures comprising a pair of brackets for supporting a receptacle thereon in spaced relationship to said conveyor, a seating device mounted on said support frame adjacent to the path of travel of said receptacles, said seating device comprising a pressing bar for urging a component into a predetermined position within a receptacle, a sensing device secured to said support frame adjacent to said seating device and said conveyor, said sensing device comprising a pivotally mounted roller arm for ascertaining a component in other than a predetermined position within the receptacle, switch means engageable with said pivotally mounted roller arm and rendered operable upon ascertainment of a component not properly seated within a receptacle, control means for rendering said chain drive means inoperable upon the actuation of said switch means, a fabricating device mounted on said support frame adjacent to said sensing device, said fabricating device comprising a plurality of downwardly projecting crimping elements engageable with a portion of said receptacle for securing a component therein, a turntable having a portion thereof positioned in spaced horizontal alignment with said chain conveyor, a transfer plate mounted on said support frame and interposing said chain conveyor and said turntable, said transfer plate being mounted in horizontal alignment with the path of travel of articles being advanced from said fabricating device and positioned above a portion of said turntable for depositing articles thereon, a drive shaft secured to and projecting upwardly through said turntable, means for imparting continuous rotary motion to said shaft and said turntable, a pulley secured to the upper extremity of said turntable drive shaft for movement therewith, and an endless belt mounted for movement on said pulley and engageable with articles being advanced by said turntable for rotating the articles relative to said turntable and across the surface thereof.

5. In combination with a conveying apparatus of the type wherein a succession of articles are placed nonaxially on a flat upper surface of a turntable which rotates about a vertical axis to carry the articles about the turntable axis; an apparatus for transferring each article from the turntable to a receiving location adjacent to the periphery of the turntable, which comprises an endless belt mounted in a fixed position a short distance above the upper surface of the turntable so that the turntable may rotate therebeneath, said belt having a vertically disposed operating run which extends along a straight line from a point near the center of the turntable to a point near the outer periphery thereof and adjacent to the receiving location so as to stop the movement of the articles with the turntable, and means for driving said endless belt so that the operating run thereof travels away from the rotational axis of the turntable and toward the receiving location, whereby each article is urged against the belt by the motion of the turntable and is moved off of the turntable and to the receiving location by the motion of the belt.

References Cited in the file of this patent

UNITED STATES PATENTS

| | | |
|---|---|---|
| 1,524,641 | Mayers | Jan. 27, 1925 |
| 1,698,786 | Finn | Jan. 15, 1929 |
| 1,737,829 | Cosgrove | Dec. 3, 1929 |
| 1,753,560 | Emmert | Apr. 8, 1930 |
| 1,831,283 | Baker | Nov. 10, 1931 |
| 2,180,284 | Meyer | Nov. 14, 1939 |
| 2,551,427 | Elletson | May 1, 1951 |
| 2,554,982 | Hartley | May 29, 1951 |
| 2,569,711 | Foster | Oct. 2, 1951 |
| 2,706,330 | Nelson | Apr. 19, 1955 |
| 2,723,728 | Crawford | Nov. 15, 1955 |
| 2,757,440 | Carman | Aug. 7, 1956 |
| 2,775,283 | Greer | Dec. 25, 1956 |
| 2,803,870 | Uphoff | Aug. 27, 1957 |
| 2,809,421 | Dowse | Oct. 15, 1957 |